United States Patent
Kujirai et al.

(10) Patent No.: US 7,619,758 B2
(45) Date of Patent: Nov. 17, 2009

(54) INFORMATION PROCESSING APPARATUS AND METHOD OF CONTROLLING SAME, PRINT CONTROL APPARATUS, METHOD AND PROGRAM, AND STORAGE MEDIUM WITH TRANSMISSION OF INSTALLATION SET INCLUDING PRINTER DRIVER AND FUNCTION EXPANSION MODULE OR PRINTER DRIVER WITHOUT FUNCTION EXPANSION MODULE

(75) Inventors: Yasuhiro Kujirai, Berkshire (GB); Masanori Aritomi, Tokyo (JP); Hiroshi Oomura, Yokohama (JP); Yoshihiro Takagi, Yokohama (JP); Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 11/214,004

(22) Filed: Aug. 30, 2005

(65) Prior Publication Data

US 2006/0044586 A1 Mar. 2, 2006

(30) Foreign Application Priority Data

Aug. 30, 2004 (JP) .............................. 2004-250930
Aug. 24, 2005 (JP) .............................. 2005-242064

(51) Int. Cl.
*G06F 3/12* (2006.01)
(52) U.S. Cl. ..................... 358/1.13; 358/1.14; 358/1.15; 719/321; 709/220; 709/221
(58) Field of Classification Search ................ 358/1.13, 358/1.14, 1.15; 719/321; 709/220, 221
See application file for complete search history.

(56) References Cited

U.S. PATENT DOCUMENTS

| 5,692,111 | A | * | 11/1997 | Marbry et al. | ............. | 358/1.15 |
| 5,699,495 | A | * | 12/1997 | Snipp | ........................ | 358/1.15 |
| 6,607,314 | B1 | * | 8/2003 | McCannon et al. | ........... | 400/62 |

(Continued)

FOREIGN PATENT DOCUMENTS

JP 10-198569 7/1998

(Continued)

OTHER PUBLICATIONS

Windows Server 2003—Windows Point and Print Technical Overview, Microsoft Corporation, Mar. 2003 (attach. previously).*

*Primary Examiner*—Twyler L Haskins
*Assistant Examiner*—Jacky X Zheng
(74) *Attorney, Agent, or Firm*—Fitzpatrick, Cella, Harper & Scinto

(57) ABSTRACT

An information processing apparatus for transmitting an installation set of a printer driver to another information processing apparatus, comprises decision unit adapted to decide whether an installation set that activates a function expansion module is to be transmitted to the other information processing apparatus; and transmitting unit adapted to transmit an installation set in which the function expansion module is activated to the other information processing apparatus if the decision unit has decided that the installation set that activates the function expansion module is to be transmitted, and transmits an installation set in which the function expansion module is not activated to the other information processing apparatus if the decision unit has decided that the installation set that activates the function expansion module is not to be transmitted to the other information processing apparatus.

17 Claims, 14 Drawing Sheets

U.S. PATENT DOCUMENTS

| | | | |
|---|---|---|---|
| 2002/0122199 A1* | 9/2002 | Lomas et al. | 358/1.14 |
| 2003/0200289 A1* | 10/2003 | Kemp et al. | 709/221 |
| 2004/0223182 A1* | 11/2004 | Minagawa | 358/1.15 |
| 2005/0069361 A1* | 3/2005 | Wang et al. | 400/61 |
| 2005/0162678 A1* | 7/2005 | Nakata | 358/1.13 |

FOREIGN PATENT DOCUMENTS

| | | |
|---|---|---|
| JP | 2003-058378 | 2/2003 |
| JP | 2004-265061 | 9/2004 |

* cited by examiner

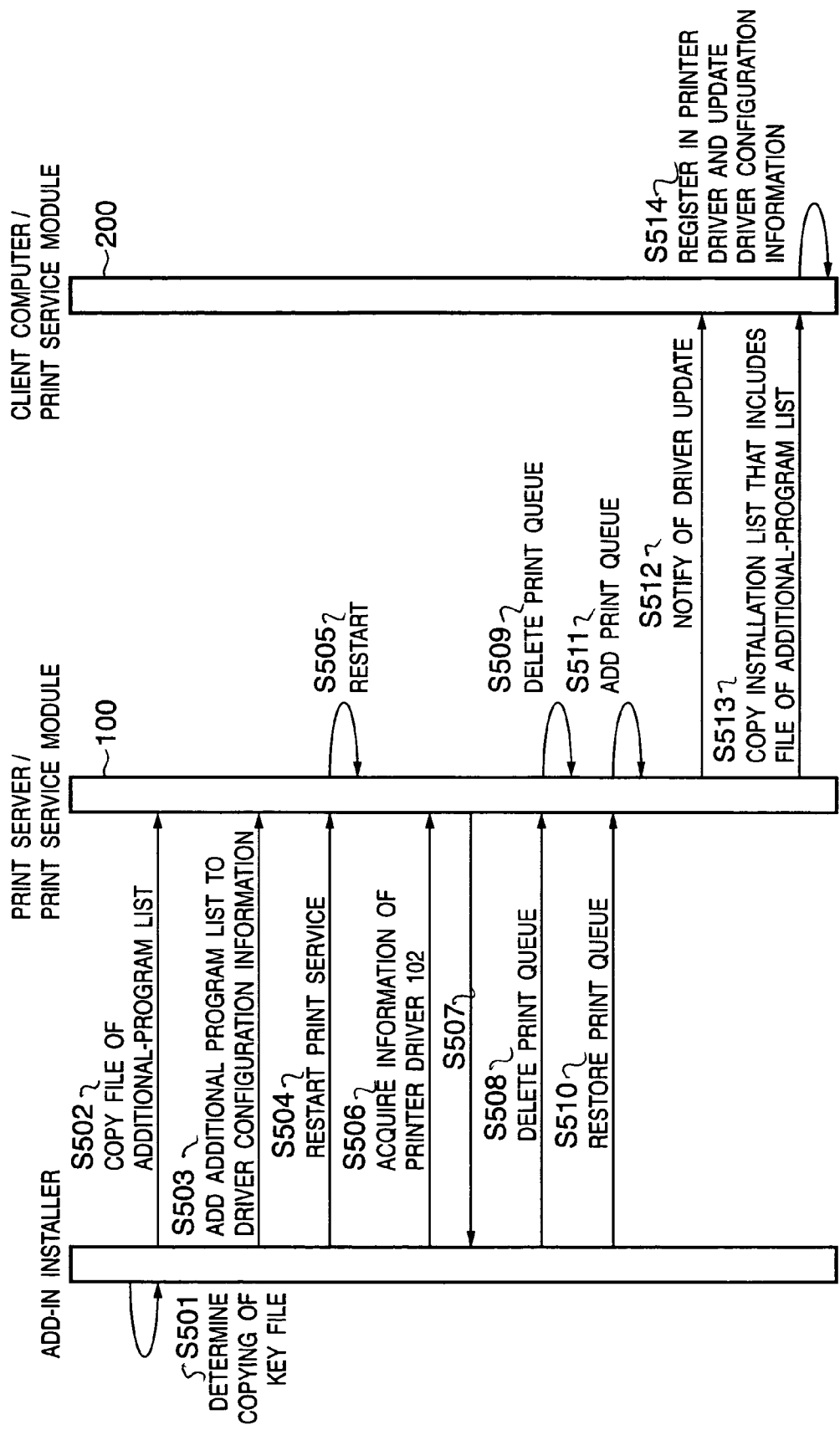

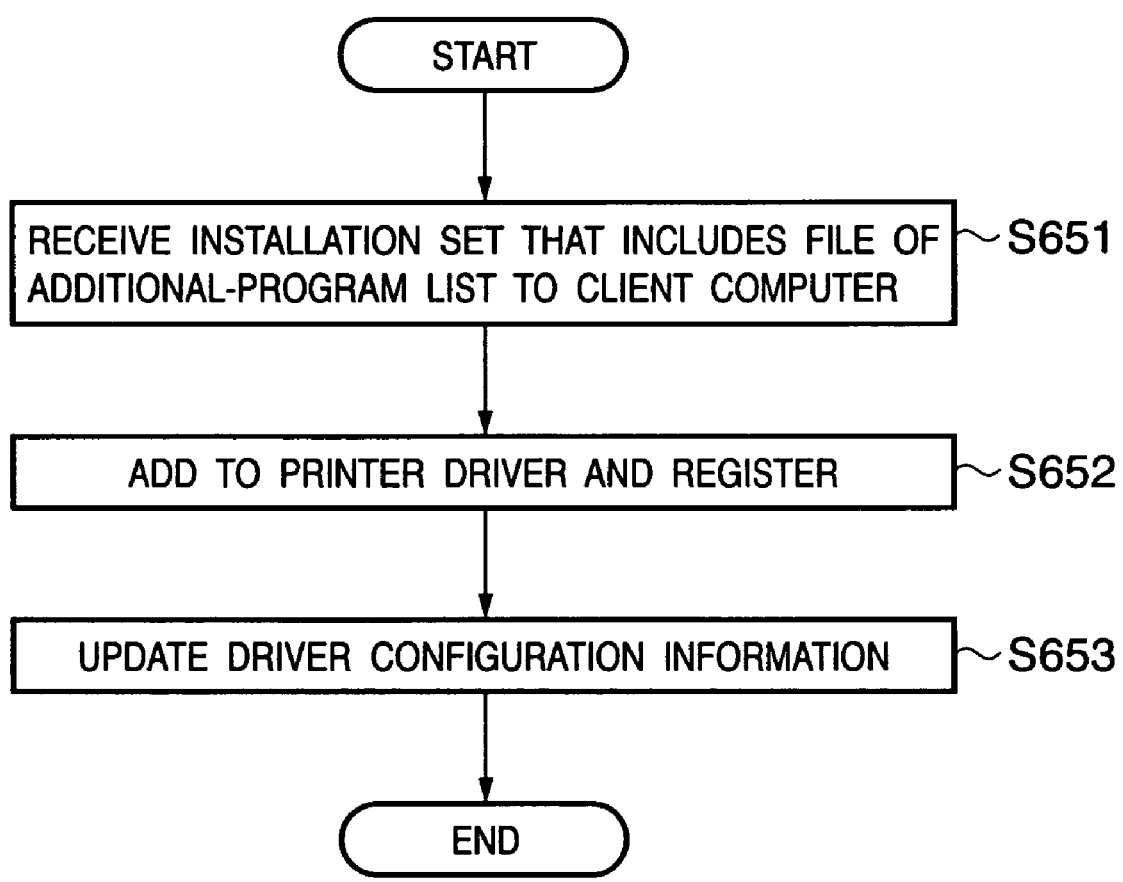

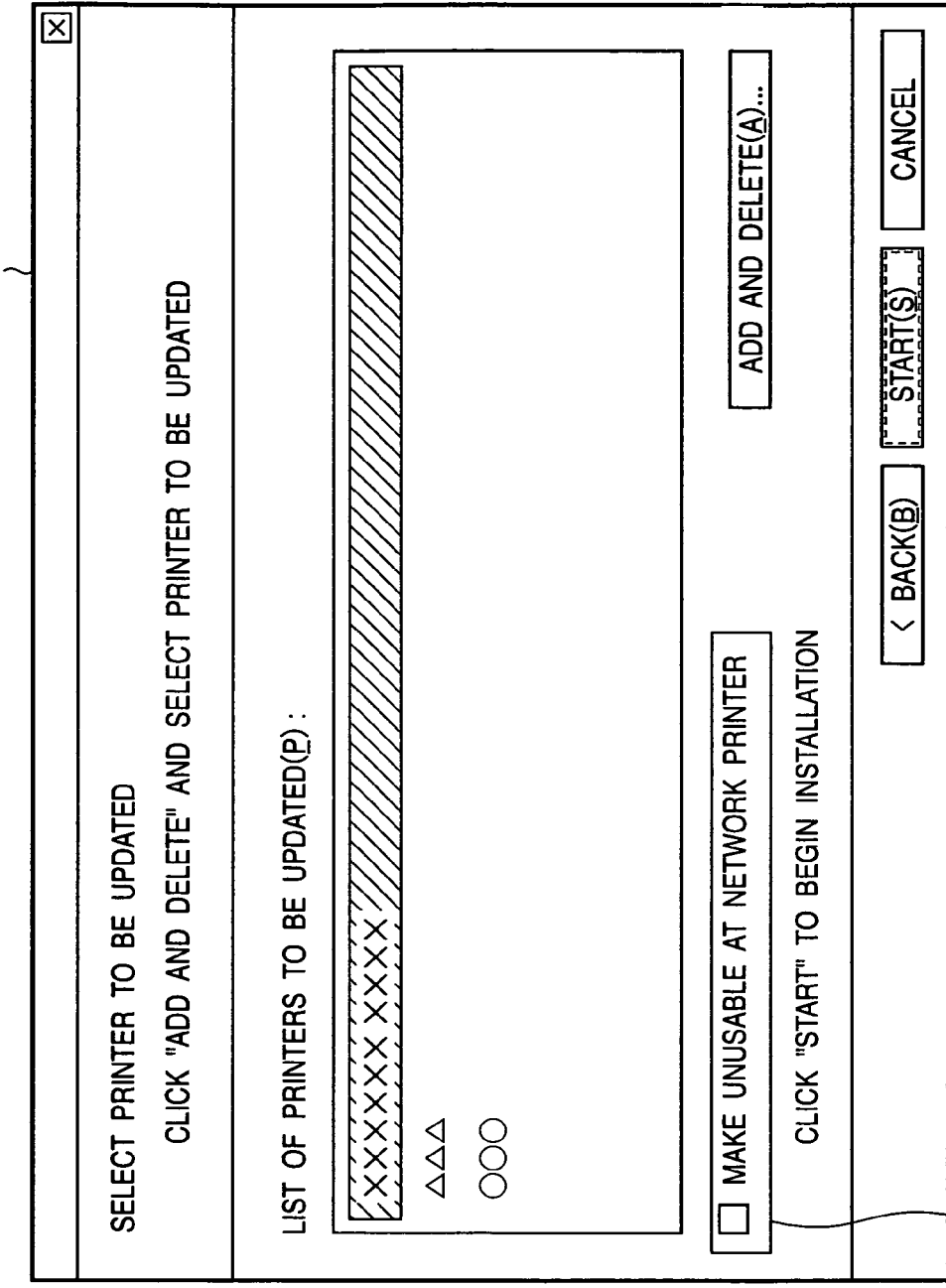

FIG. 8

PROPERTIES OF LBP-2810

| GENERAL | SHARED | PORT | DETAILED SETTINGS | COLOR MANAGEMENT | DEVICE SETTINGS | PREFERENCES |

LBP-2810

LOCATION(L):

COMMENTS(C):

MODEL(O): LASER SHOT LBP-2810

FUNCTIONS
COLOR : YES
DOUBLE-SIDED : YES
STAPLE : NO
SPEED : 22 ppm
MAXIMUM RESOLUTION : 600 dpi

USABLE PAPER:
A4
A3

PRINT SETTINGS(I)...    PRINT TEST PAGE(T)

OK    CANCEL    APPLY(A)    HELP

801

INFORMATION PROCESSING APPARATUS AND METHOD OF CONTROLLING SAME, PRINT CONTROL APPARATUS, METHOD AND PROGRAM, AND STORAGE MEDIUM WITH TRANSMISSION OF INSTALLATION SET INCLUDING PRINTER DRIVER AND FUNCTION EXPANSION MODULE OR PRINTER DRIVER WITHOUT FUNCTION EXPANSION MODULE

FIELD OF THE INVENTION

The present invention relates to an information processing apparatus and a method of controlling same, a print control apparatus, method, and program, and a storage medium storing the program.

BACKGROUND OF THE INVENTION

Considerable research and development have been devoted in recent years to information processing systems in which information processing is executed upon connecting a host computer and a printer together through an interface such as the Centronics interface or a network such as Ethernet, and such systems are now in practical use.

In a case where a laser printer, for example, is used as the printer connected to the host computer in an information processing system of this kind, the laser printer analyzes print data that enters the laser printer from the host computer. The laser printer then expands the entered print data into bitmap data as output data and causes a laser beam, which has been modulated based upon the expanded bitmap data, to scan across and expose a photosensitive drum, thereby printing the image represented by the data.

At least one application program (referred to simply as an "application" below) relating to the printing functions of printers is installed in the host computer. Also installed in the host computer is a program (referred to as a "printer driver" below) for exercising more detailed print control by interceding in print processing from such an application to a specific printer.

The printer driver usually is distributed in the form of a group of files (referred to generically as an "installation set") having a plurality of program files and data files. The introduction (referred to as "installation" below) of the printer driver into the host computer for the purpose of establishing a state in which the printer driver can be used is usually controlled by an operating system that has already been installed in the host computer. Processing whereby a copy of the installation set and information related to the printer driver are registered in the operating system is executed by an operation performed by the user or by a program in the installation set. The term "installation set" refers to a program data group used when an installation is made to the computer. In embodiments that are explained hereafter, the program data group includes at least one among a printer driver module, key data and function expansion module.

Information processing systems have undergone further development, and print server systems in which a host computer connected to a printer is adopted as a print server and the printer is made to execute printing based upon a request from a client computer connected via a network also have also similarly undergone research and development and some have been put into practical use.

Installing a printer driver utilizing a Point & Print function has the following advantages in a case where the user who operates the client computer 20 performs printing by designating a shared printer: (i) the operation for installing the necessary printer driver can be performed automatically; (ii) the updating of the driver configuration information in the print server is reflected on the side of the client computer automatically; and (iii) when the printer driver is installed in the client computer by an operation performed by the user, a storage medium such as a CD-ROM storing the printer driver is unnecessary.

As an example of an information processing technique for installing a printer driver, it has been attempted to add and delete a function expansion module, such as program files and data files, that is for the purpose of expanding the functions of the printer driver after the printer driver has been installed.

Further, in a case where a printer driver that is to undergo an expansion of functionality has already been downloaded to a client computer by Point & Print, it has been attempted to add a module, which has been added on by the print server, to the printer driver in the client computer automatically to thereby install the additional module.

Furthermore, as an example of the prior art, the specification of Japanese Patent Application Laid-Open No. 2003-058378 discloses an information processing technique in which when different programs of both old and new versions are installed with regard to a program that has already been installed, normal operation of these programs is made possible.

Since a mechanism whereby the functions of a printer driver are expanded by additionally installing a function expansion module in a printer driver that has already been installed provides the user with added value, it has been contemplated to furnish, as extra-cost software, function expansion modules and a program for additionally installing these modules. With regard to such follow-up expansion of functions, the protection of the commercial value of software has been sought as by attaching a certain condition to inhibit utilization of the mechanism through which printer driver functions are expanded.

With these conventional attempts, however, a function expansion module for implementing expansion of the functions of the printer driver in the client computer on the network is installed without limitation when the printer driver that has been stored in the print server is shared with the client computer owing to Point & Print. In a case where a program module that makes expansion of functions possible is additionally installed, it is necessary to prevent the unlimited distribution of the program module to thereby protect the commercial value of the program module. The prior art, however, does not take this point into account. In other words, in instances where a function expansion module for expanding the functionality of a printer driver is furnished as extra-cost software, a problem which arises is a decline in the commercial value of the software.

The present invention has been devised in order to solve the problems mentioned above. Specifically, a first object of the present invention is to provide an information processing technique for controlling whether data (referred to as a "key file" or "key data" below), which is necessary to activate a program module for expanding the functions of a printer driver, or a function expansion module is to be included in an installation set that is to be additionally installed, thereby preventing the function expansion module from being utilized in another information processing apparatus unconditionally.

A second object of the present invention is to provide a print control technique in which when key data becomes necessary in order for a function expansion program for expanding the functions of a printer driver to operate and the key data does not exist, a print request is processed upon inhibiting the expansion of functions, thereby protecting the commercial value of a program module that is for expanding functionality.

SUMMARY OF THE INVENTION

According to the present invention, the first object is attained by providing an information processing apparatus for transmitting an installation set of a printer driver to another information processing apparatus, comprising:

decision unit adapted to decide whether an installation set that activates a function expansion module is to be transmitted to the other information processing apparatus; and transmitting unit adapted to transmit an installation set in which the function expansion module is activated to the other information processing apparatus if said decision unit has decided that the installation set that activates the function expansion module is to be transmitted, and transmits an installation set in which the function expansion module is not activated to the other information processing apparatus if the decision unit has decided that the installation set that activates the function expansion module is not to be transmitted to the other information processing apparatus.

Further, according to the present invention, the second object is attained by providing a program for controlling an information processing apparatus comprising:

an acquisition module for acquiring key data necessary in order to use a function expansion module; and an execution module for causing a printer driver to execute a function, in which utilization of functionality of the function expansion module is restricted, if said acquisition module has not acquired the key data of the function expansion module.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating the flow of installation of a function expansion module and key file in a print server according to the first embodiment;

FIG. 6B is a flowchart illustrating the flow of processing in a client computer according to the first embodiment;

FIG. 7 is a diagram illustrating an example the user interface of an installer;

FIG. 8 is a diagram exemplifying the user interface of a printer driver before an additional file relating to an expansion function is installed by an add-in installer;

DETAILED DESCRIPTION OF THE PREFERRED EMBODIMENTS

Preferred embodiments of the present invention will now be described in detail in accordance with the accompanying drawings.

First Embodiment

Figure 1:
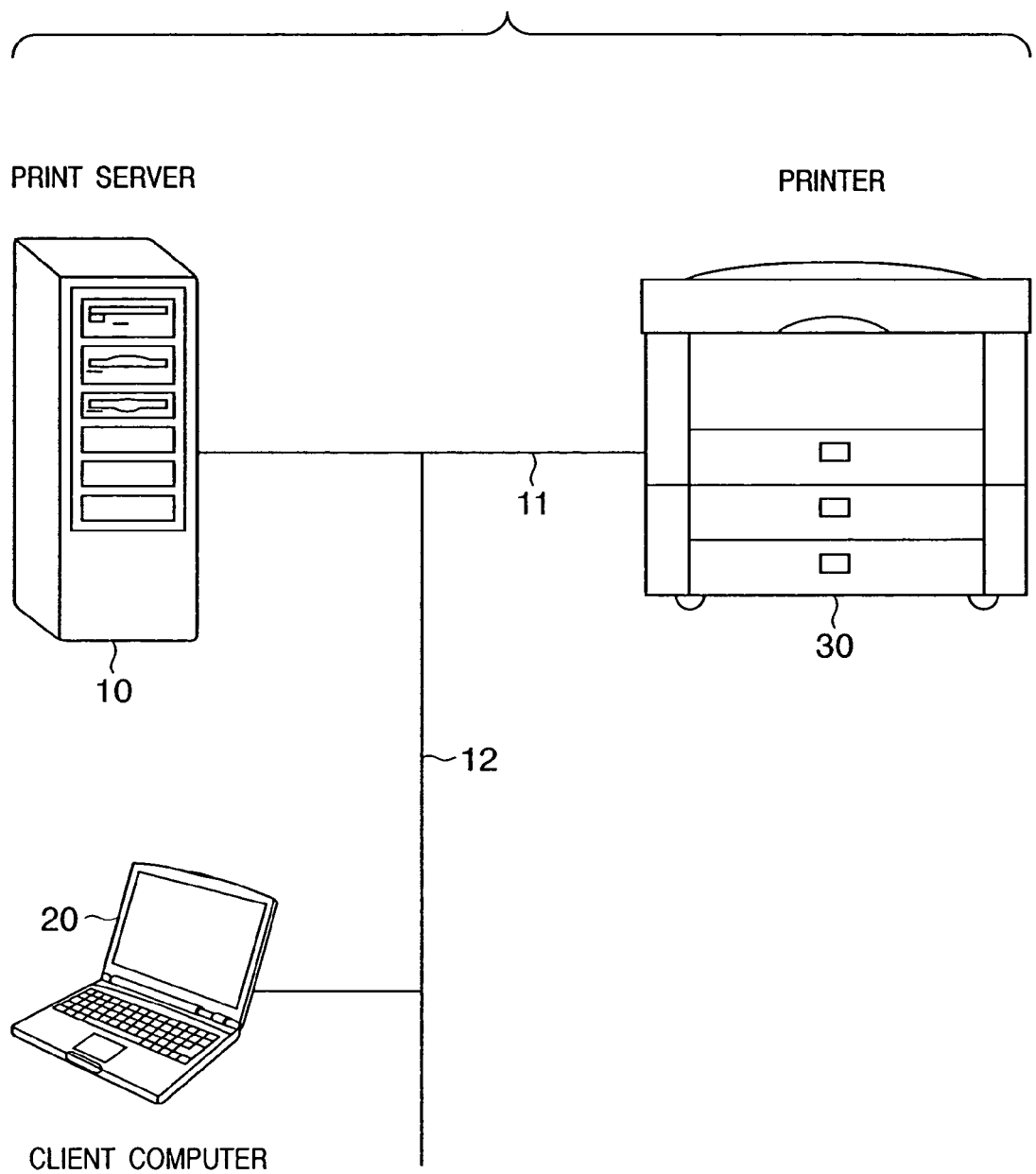
FIG. 1 is a diagram illustrating an example of the configuration of a print server system.
Figure 3A:
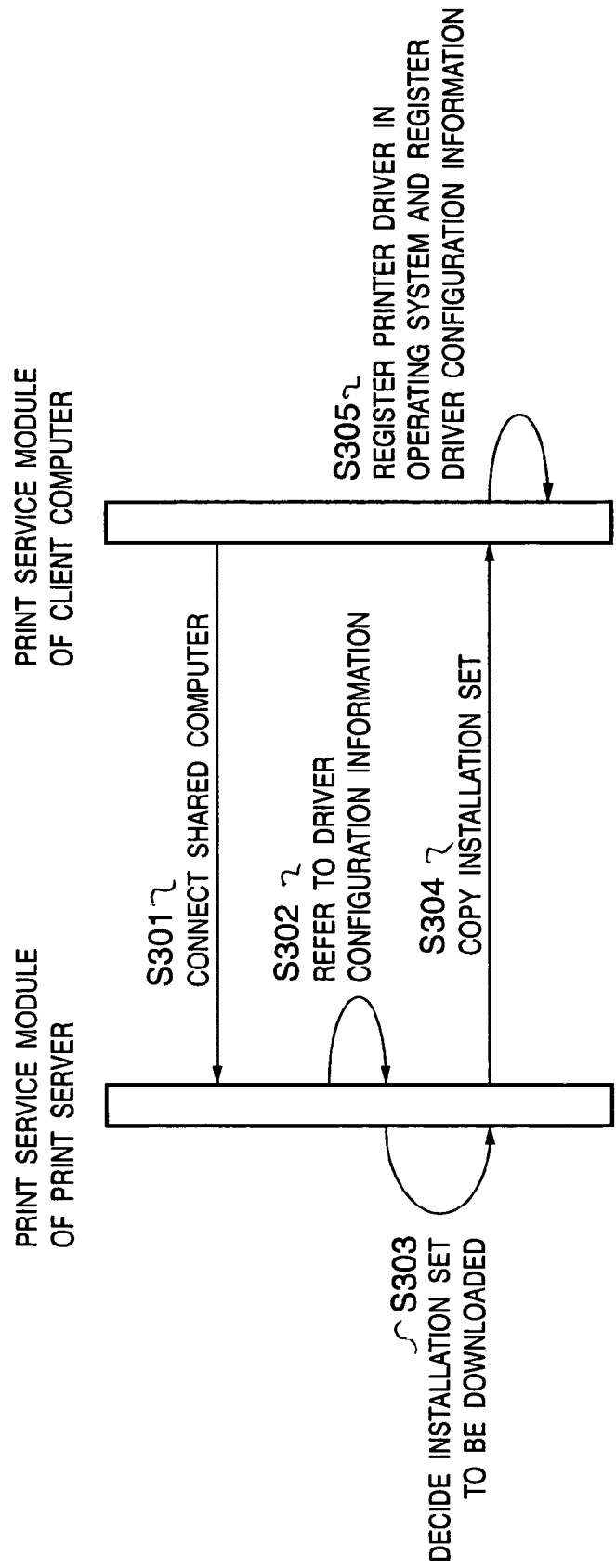
FIG. 3A is a diagram illustrating the flow of a typical installation of a printer driver utilizing the Point & Print function.
Figure 3B:
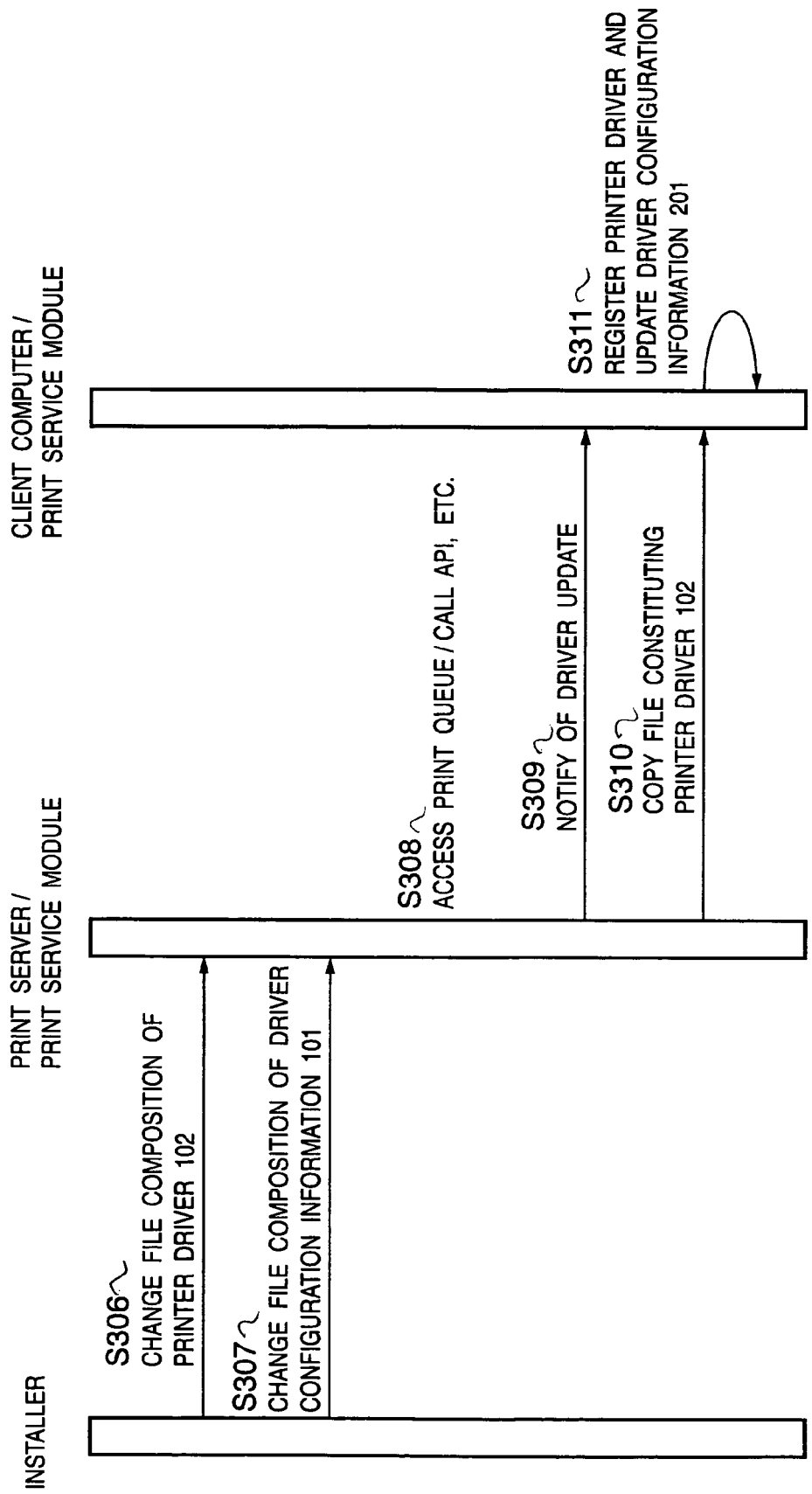
FIG. 3B is a diagram illustrating the flow of typical update processing of a printer driver installed utilizing the Point & Print function.

Preconditions of the embodiment are explained by referring of FIGS. 1, 3A and 3B. FIG. 1 is a diagram illustrating an example of the configuration of the above-mentioned print server system. The system comprises a print server 10, which is a host computer, a client computer 20 and a laser printer 30. The print server 10 and laser printer 30 are connected by an interface such as the Centronics interface or by a network 11 such as Ethernet, and the print server 10 and client computer 20 are connected by a network 12 such as Ethernet.

Rather than allowing the print server 10 itself to generate print data and cause the laser printer 30 to execute printing, the print server system is configured for the purpose of allowing the print server 10 to intercede in print data generated by the client computer 20 so that the printer will execute printing based upon this print data. Accordingly, at least one application program having a print function is installed in the print server 10, as mentioned above. At the same time, a printer driver that intercedes in printing from the application program to the printer 30 also is installed in the print server 10. A similar application program having at least one print function also is installed in the client computer 20.

In order for the user who is utilizing the client computer 20 to make the printer 30 the output destination of the print data and cause the printer 30 to execute print processing, it is required at this time that a printer driver identical with the one that has been installed in the print server 10 be installed in the client computer 20. The reason for this is that the intervention of the printer driver in the print server 10 is necessary before print data generated by the application in the client computer 20 is input to the printer 30.

Accordingly, in the print server system of the kind shown in FIG. 1, it is required that a printer driver identical with the one that has been installed in the print server 10 be installed in the client computer 20. A problem, however, is that the task of installation represents a burden upon the user who utilizes the client computer 20.

A "Point & Print" (registered trademark, no longer pointed out below) function in Microsoft's Windows (registered trademark, no longer pointed out below) operating system is known as a method of solving this problem. "Point & Print" is an operating system function that installs a printer driver from a print server to a client computer in an efficient manner.

The flow of processing for installing a printer driver from a print server to a client computer by the Point & Print function will now be described based upon FIG. 2.

Figure 2:
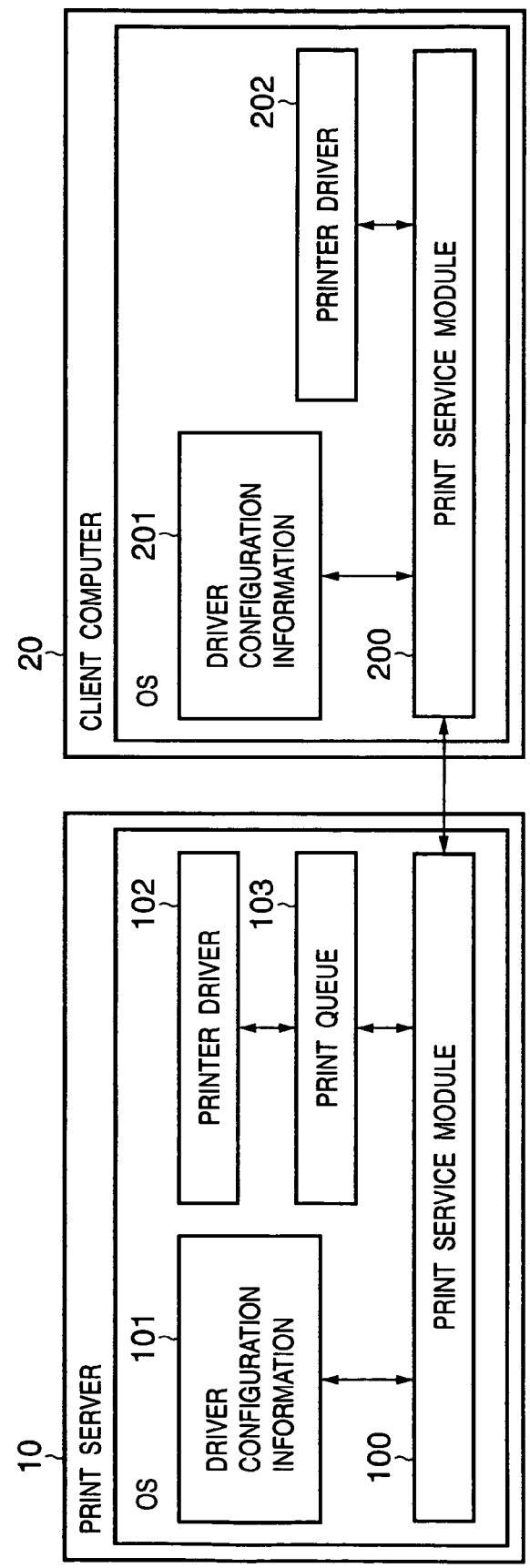
FIG. 2 is a diagram illustrating an example of the structures of program modules relating to installation of a printer driver in a print server and client computer.

FIG. 2 is a diagram illustrating an example of the structures of program modules relating to installation of a printer driver in the print server 10 and client computer 20. A print service module 100 in the print server 10 is a service program for controlling print processing and installation of a printer driver in the operating system. Driver configuration information 101, which relates to a printer driver 102, has been stored in a shared storage area of the operating system. The content of processing by a print service module 200 in the client computer 20 is similar to that of the print service module 100 of print server 10.

Driver configuration information 201 corresponds to a printer driver 202. When Point & Print is not functioning, the driver configuration information 201 does not exist in the client computer 20. The printer driver 202 and the driver configuration information 201 are installed in the client computer 20 by Point & Print.

FIG. 3A is a diagram illustrating the flow of a typical installation of a printer driver utilizing the Point & Print function. First, the user who is utilizing the client computer 20 designates a shared printer via the print service module 200 and transmits a Point & Print request to the print service module of the print server 10 (S301).

In response to the request transmitted from the print service module 200 of the client computer 20, the print service module 100 of the print server 10 refers to the driver configuration information 101 (S302) and decides the installation set of the printer driver to be downloaded to the client computer 20 (S303).

While cooperating with the print service module 200, the print service module 100 copies the installation set of the printer driver 102, which has been stored in the storage area of the print server 10, to the client computer 20 (S304). The print service module 200 registers the printer-driver, which has been downloaded by the installation set, in the operating system of the client computer 20 and similarly registers the driver configuration information 201 in the shared storage area of the operating system (S305).

As a result, the print server 10 and client computer 20 come to share the same printer driver and driver configuration information. The user can designate the printer 30 as a shared printer from the client computer 20 and can execute printing immediately.

Reference will be had to FIG. 3B to describe the flow of processing when configuration updating of the printer driver 102 of print server 10 is reflected in the printer driver 202 of client computer 20 installed utilizing the Point & Print function.

The installer, which is distributed by way of a CD-ROM or the like, is executed in the print server 10 and is for adding new files to the printer driver 102, updating already existing files of the printer driver 102 and deleting already existing files from the printer driver 102. The printer driver 102 that has been updated by these operations is stored in a memory (a storage area of the operating system) of the print server 1000 (S306).

Next, if a file was added anew at S306, the file name is appended to the driver configuration information 101 by the installer. If an existing file was deleted at S306, then the name of this file is deleted from the driver configuration information 101 by the installer (S307).

If execution of printing from the client computer 20 is started by the user or the print queue is accessed by the print server (S308), the print service module 100 notifies the print service module 200 of the client computer 20 so as to update the printer driver 202 (S309). The print service module 100 then transmits the installation set, which constitutes the printer driver 102 described in the driver configuration information 101, to the client computer 20 (S310). Upon receiving this transmission, the print service module 200 of the client computer 20 re-registers the installation set as the printer driver 202 and updates the configuration information 201 (S311).

Figure 4A:
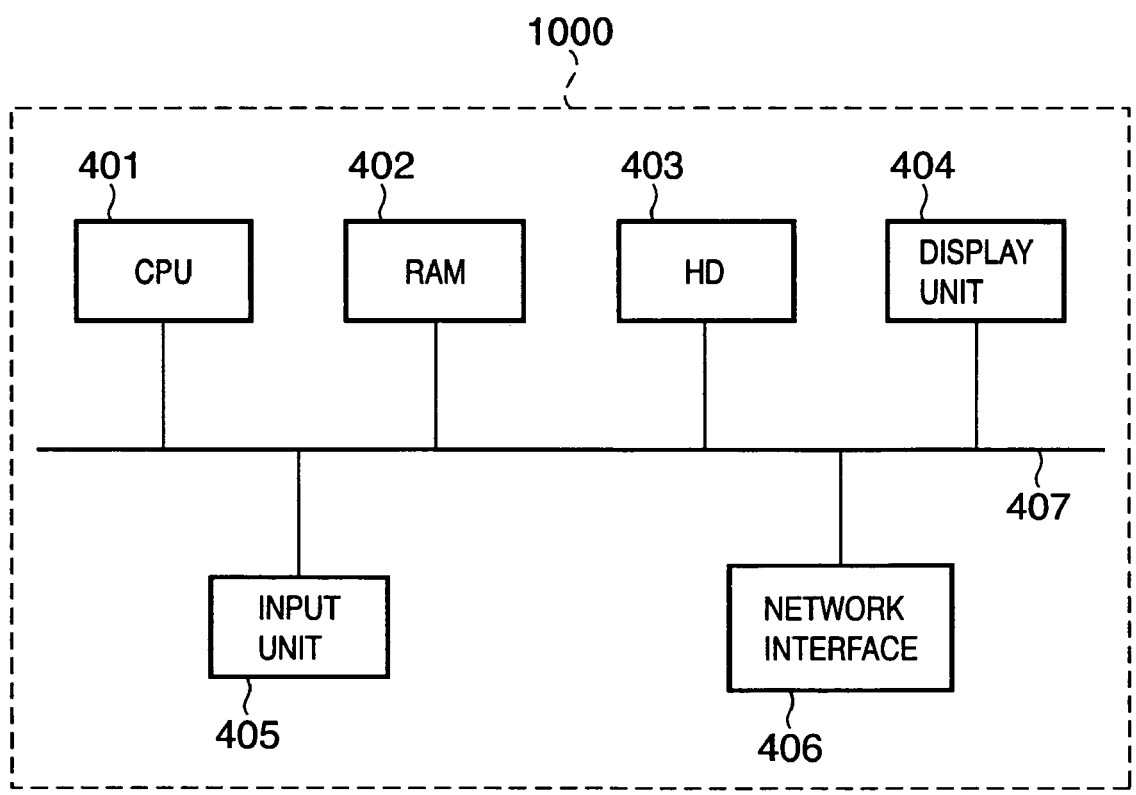
FIG. 4A is a block diagram illustrating a hardware implementation of a print server according to a first embodiment of the present invention.

FIG. 4A is a block diagram illustrating a hardware implementation of a print server according to a first embodiment of the present invention.

As shown in FIG. 4A, the print server includes a CPU 401 that executes processing relating to this embodiment in accordance with a program that has been loaded in a RAM 402. The latter is used as a memory area for storing various programs, a work area when control processing is executed by the CPU 401, and as a memory area for storing various data temporarily. An operating system and various programs are installed beforehand in a hard disk (HD) 403. When the server is started up or launch of a program is instructed, the program is loaded in the RAM 402 and is executed under the control of the CPU 401. A display unit 404 comprises a CRT or liquid crystal panel, by way of example. An input unit 405, which includes a keyboard and a pointing device such as a mouse, is used to input data conforming an operation performed by the user.

A network interface 406 is an interface unit for making a connection to an Ethernet or the Internet. An additional file [e.g., a key file or function expansion module (the contents of which will be described in detail later with reference to FIG. 4B], which is to be additionally installed, and an installation set are transmitted via the interface unit to a client computer, which is connected on the network, under the control of the CPU 401 and an add-in installer 104 (the content of which will also be described in detail later with reference to FIG. 4B). The network interface 406, CPU 401 and add-in installer 104 can function as a communication unit for sending and receiving data to and from the client computer via the network.

A system bus 407 connects these components to the CPU 401 and transmits data and various control signals.

It should be noted that the hardware implementation of the client computer also is basically the same as that of this print server and need not be described here.

Figure 4B:
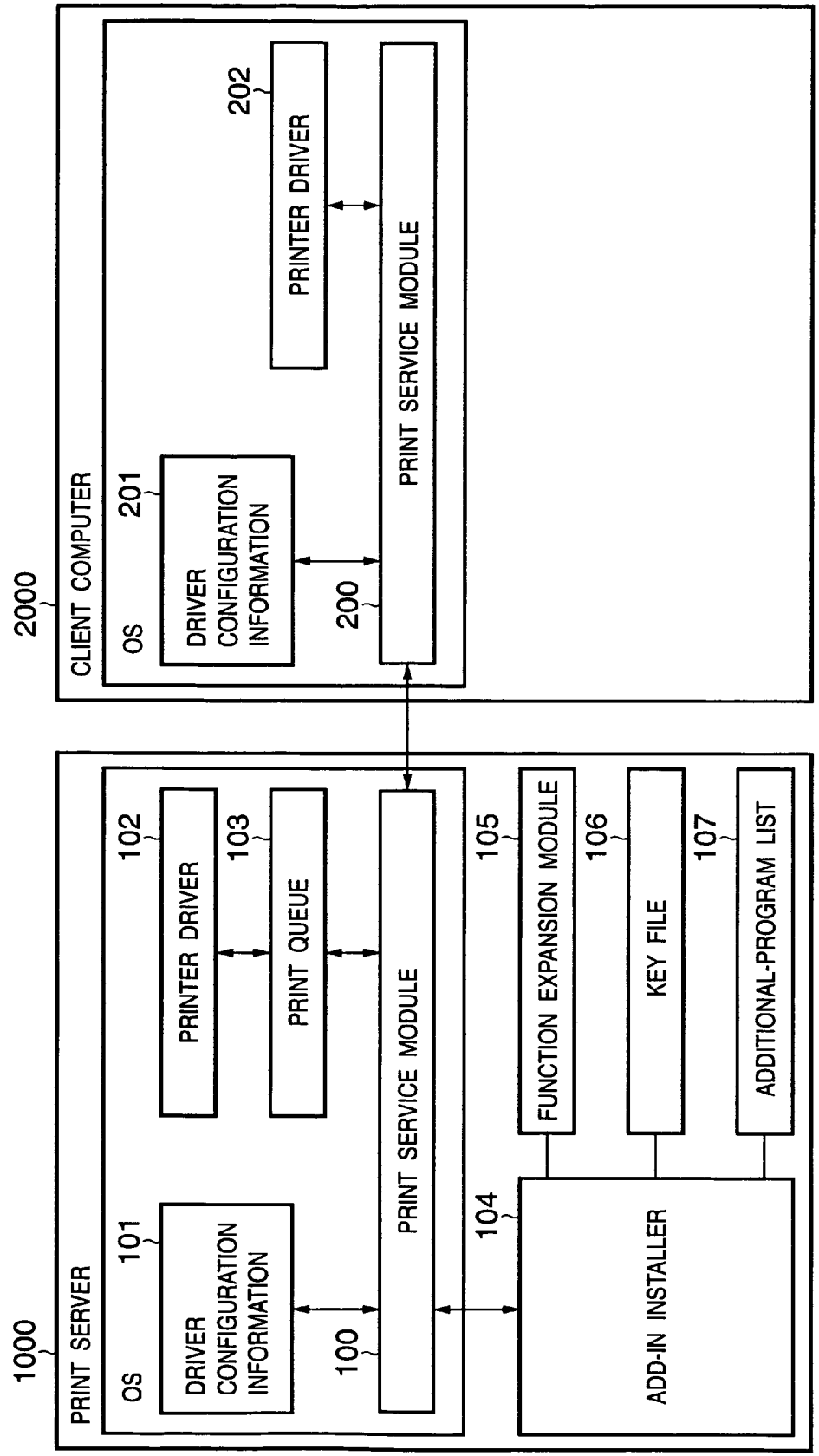
FIG. 4B is a block diagram illustrating a functional configuration of a print server system according to the first embodiment.

FIG. 4B is a block diagram illustrating the functional configuration of a print server system according to this embodiment. Blocks in FIG. 4B similar to those shown in FIG. 2 are indicated by like reference characters. The arrangement of FIG. 4B differs from that of FIG. 2 in that it additionally includes the add-in installer 104, a function expansion module 105, a key file 106 and an additional-program list 107.

The add-in installer 104 performs an additional installation with regard to a file that has been registered in the additional-program list 107. The function expansion module 105 is registered in the additional-program list 107 beforehand, and the key file 106 is registered in the additional-program list 107 under a certain condition.

The add-in installer 104 is an information processor that is at the core of this embodiment. The add-in installer 104 has a file addition module for executing file addition processing in accordance with the additional-program list 107; a file registration module for performing processing to register an added file (additional file or additional program); a recognition module for allowing the print service module 100 to recognize a change in module configuration; a judgment module for judging whether a printer driver is being used for the purpose of controlling a shared printer; a notification module for notifying another computer, which is connected to the shared computer, of a change in module configuration; a deletion module for deleting a file addition module; a registration cancellation module for cancelling registration of a file addition module; a key-file addition determination module for determining whether the key file 106 is included in the additional-program list 107; and an additional-program list changing module for adding the key file 106 to the additional-program list 107 in accordance with the result of the determination made by the key-file addition determination module.

The function expansion module 105 is a program file such as a DLL (Dynamic Link Library). By additionally installing this module, operation becomes possible in cooperation with other program modules contained in a printer driver to be added on. The program of the function expansion module 105 operates so as to add a function such as a special printing (image processing, encoding processing, etc.) function by a printer driver to the printer driver 102 and to expand the function of the printer driver 102.

Further, the key file 106 is a file necessary in order to activate the function expansion of the function expansion module 105. The file format of this file is not particularly limited.

The add-in installer 104, function expansion module 105, key file 106 and additional-program list 107 are distributed together with an electronic file such as a software licensing agreement by means of CD-ROM media on which these have been recorded, or via a network, and they are copied to the system of print server 1000. In this embodiment, an administrative user who utilizes the print server 1000 executes the program of the add-in installer 104, whereby operation starts.

FIG. 5 is a diagram illustrating the flow of installation of the function expansion module 105 and key file 106 in the print server 1000 according to this embodiment. The printer driver 202 of the client computer 20 already installed utilizing the Point & Print function is updated by this operation.

In response to start-up of the add-in installer 104 in FIG. 5, the key-file addition determination module determines whether the key file 106 will be included in the additional-program list 107 (S501). If the key file is to be added, then the key file 106 that has been registered in the additional-program list 107 is copied to the memory of the print server 1000 (the storage area of the operating system) by the file addition module (S502).

Next, the added additional-program list 107 is additionally registered in the driver configuration information 101 by the registration module (S503).

In the case of this embodiment, S504, S506, S508 and S510 may be executed by the add-in installer 104 in order to actively cause the driver-update notification event generated by the operating system at the time of an operation as by the user at S308 in FIG. 3B.

Restarting of the print service module 100 is ordered by the recognition module (S504). As a result, the print service module 100 is restarted at step S505.

Information as to whether the printer driver 102 is being used for the purpose of controlling a shared printer is acquired by the judgment module at steps S506 and S507.

The notification module instructs the print service module 100 to cancel a print queue (S508) and to restore a print queue (S510). Steps S509 and S511 indicate processing for cancellation of the print queue and addition of the print queue, respectively, in the print service module 100.

When processing for adding on a file in the print server 1000 thus ends, the print service module 100 notifies the print service module 200 of the client computer 2000 to update the printer driver 202 (S512). Next, the installation set that includes the file of the additional program list is transmitted to the client computer 2000 (S513). As a result, the print service module 200 of the client computer 2000 registers the file of the additional program list in the printer driver 202 and updates the driver configuration information 201 (step S514).

Figure 6A:
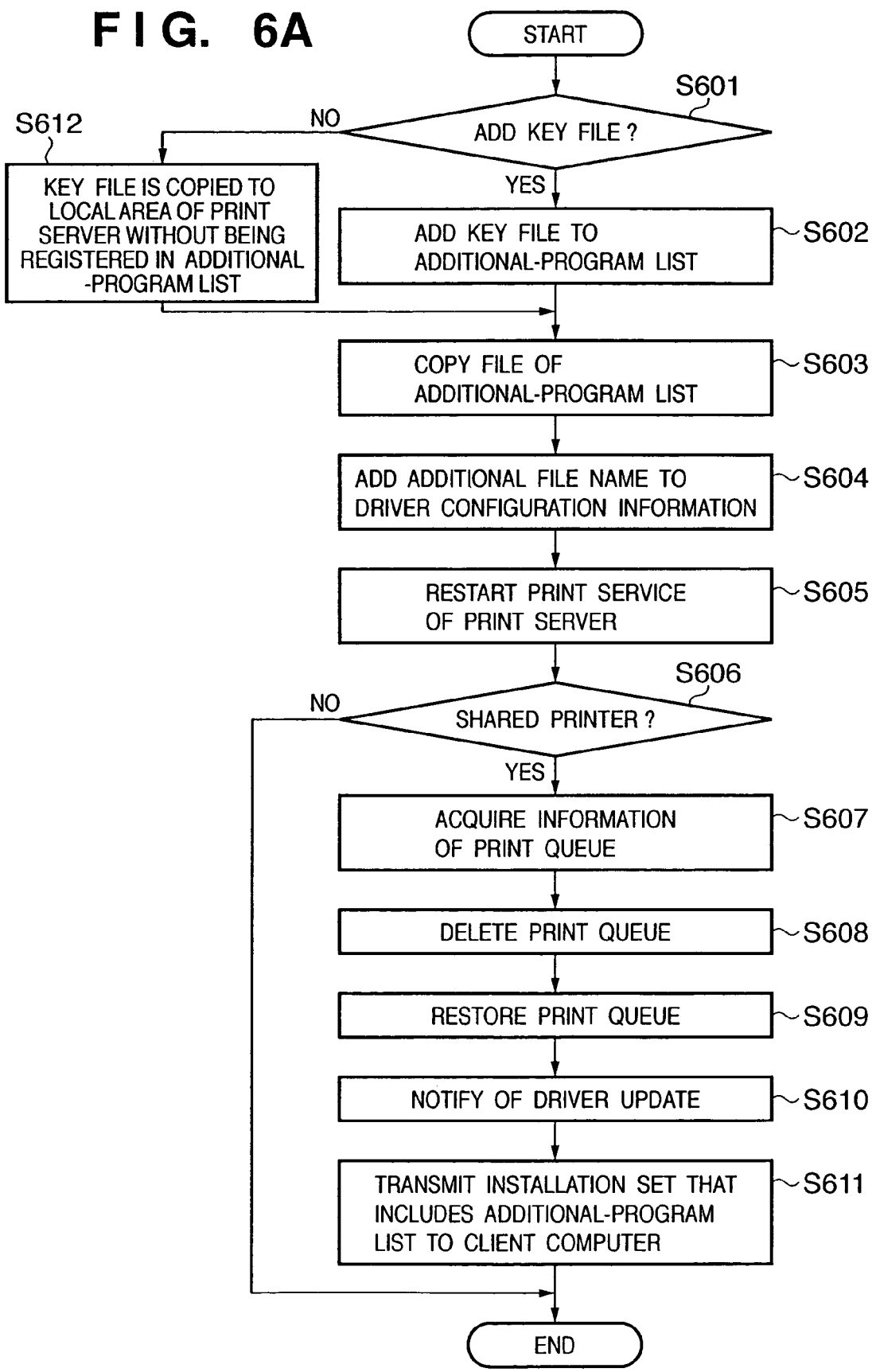
FIG. 6A is a flowchart illustrating the flow of processing in the print server according to the first embodiment.

FIG. 6A is a flowchart illustrating the flow of processing in the print server 1000 of the print server system according to this embodiment. The program for executing this processing is installed in the hard disk 403 and is executed upon being loaded into the RAM 402. This processing is started by using the input unit 405, for example, to instruct the already registered printer driver 102 to add a file anew. It should be noted that the file to be added on may be provided to the print server 1000 on a storage medium such as a CD-ROM or may be downloaded to the print server 1000 via a communication line such as the Internet.

First, at step S601, it is determined whether the print server 1000 determines whether a key file is to be additionally installed. The determination as to whether to additionally install the key file is made as follows: An installer user interface 701 of the kind shown in FIG. 7, for example, is displayed on the display unit 404 under the control of the CPU 401, and the key-file addition determination module executes the determination processing based upon whether a command to the effect that an additional file is to be made unusable has been input to a designated network printer (the printer has been designated by being highlighted in FIG. 7). The input is made using a check box 702.

If, based upon the result of the determination processing at step S601, the key file or the function expansion module is not to be added to the additional-program list and the function of the printer driver that has been installed in the client computer 2000 is not to be expanded ("NO" at step S601), then processing proceeds to step S612.

At step S612, one of at least the key file and the function expansion program is copied to the local area of the print server 1000, which is accessible by the printer driver 102, without being registered in the additional-program list 107. Usually the relative location (directory path) of the storage location of the operating system to which the copy is to be made is the same as the location at which the printer driver 102 has been stored and is capable of being acquired by querying the operating system.

The key file 106 that has been copied at step S612 is not transferred to the client computer 2000 if it has not be designated as an item for additional installation. However, reference can be had to the key file from the printer driver 102 after additional installation, and in a case where print processing is executed at the print server 1000, an expansion of function based upon the key file becomes possible. By excluding at least one of the key file and the function expansion module from the additional-program list, it is arranged so that the function expansion module cannot be operated by the client computer 2000.

If, based upon the result of the determination processing at step S601, the key file is to be added to the additional-program list and the function of the printer driver that has been installed in the client computer 2000 is to be expanded ("YES" at step S601), then processing proceeds to step S602.

Here the key file 106 is registered in the additional-program list 107 by the additional-program list changing module.

Next, at step S603, the add-in installer 104 copies the key file that has been registered in the additional-program list to the storage area of the operating system in the print server 1000 in order to perform additional installation of the key file that has been registered in the additional-program list 107 by the file addition module. In a manner similar to that of step S612, the relative location (directory path) of the storage location of the operating system to which the copy is to be made is the same as the location at which the printer driver 102 has been stored and is capable of being acquired by querying the operating system.

Next, at step S604, the add-in installer 104 additionally registers the information concerning the additional-file name (name of the key file or name of the key data is included), which has been copied at step S603, in the driver configuration information 101 by the registration module that registers additional files.

Next, at step S605, the add-in installer 104 restarts the print service module 100 by the recognition module that causes the print service module 100 to recognize a change in driver configuration. Owing to restarting of the print service module 100, the name of the additional file added to the driver-configuration information at step S604 above is recognized in the print service module 100 and, as a result, the additional file that has been registered in the additional-program list 107 is recognized as part of the file group constituting the printer driver 102.

The additional installation of the key file 106 in the print server 1000 is completed by the foregoing steps. However, in a case where an additional file (key file) that has been registered in the additional-program list 107 is to be installed also in the printer driver 202 of the client computer 2000, processing from step S606 onward is executed.

At step S606, the add-in installer 104 uses the judgment module to make a judgment upon acquiring information as to whether the printer driver 102 is being used for the purpose of controlling a shared printer. If the judgment rendered at step S606 is that the printer driver 102 is not being used for the purpose of controlling a shared printer ("NO" at step S606), then processing is exited.

On the other hand, if the judgment rendered at step S606 is that the printer driver 102 is being used for the purpose of controlling a shared printer ("YES" at step S606), then processing proceeds to step S607. Since the client computer 2000 that performs printing via the intermediary of the printer driver 102 exists, it is judged that the printer driver 102 is being used for the purpose of controlling a shared printer and, hence, processing proceeds to step S607.

Next, at step S607, the add-in installer 104 acquires and holds the information of a print queue 103 in the print server 1000. This is information necessary at step S609 described later.

Next, at step S608, the add-in installer 104 uses the notification module to notify the print service module 200 in another client computer connected to the shared printer of the fact that configuration of the printer driver (the module configuration) has changed, and therefore the print queue 103 in print server 1000 is deleted. Furthermore, at step S609, the add-in installer 104 uses the notification module to order restoration of the print queue 103 and, hence, the print queue 103 is restored in the print service module 100. At this time the information of the print queue 103 already acquired at step S607 is utilized to restore the print queue 103.

On the basis of the result of the processing at steps S608 and S609, at step S610 the print service module 100 notifies the print service module 100 in client computer 2000 of the fact that the driver-configuration information of printer driver 102 has been updated.

The installation set that includes the files of the additional-program list is transmitted to the client computer 2000 at step S611.

FIG. 6B is a flowchart illustrating the flow of processing in the client computer 2000 according to the print server system according to this embodiment.

At step S651, the client computer receives the installation set, which contains the additional files of the additional-program list, transmitted at step S611. In response, the print service module 200 of the client computer 2000 refers to the driver configuration information 201 based upon the update notification and downloads the installation set of the printer driver 102 that contains the additional files from the print server 1000. In this case, if the content of the key file 106 is to be included in the additional-program list at step S601 in FIG. 6A, the key file 106 and function expansion module are downloaded as items to be additionally installed. If the content of the key file 106 is not to be included in the additional-program list, then the function expansion module is downloaded.

In other words, the content of the key file 106 is not downloaded to the client computer 2000.

Next, at step S652, the print service module 200 registers the printer driver 102, which contains the additional files (key file and function expansion module), as the printer driver 202 in the operating system of the client computer 2000.

This is followed by step S653, at which the driver configuration information 201 of the printer driver 202 is updated based upon the files of the additional-program list and installation set received at step S651.

By virtue of the processing set forth above, when installation of an additional file is performed based upon the determination as to whether or not a key file is to be added on, it becomes possible to control whether or not an additional file in which a key file has been included will be installed in the client computer 2000. In a case where the key file is added on, it becomes possible to install the additional file (the file that has been registered in the additional-program list that specifies the program module to be additionally installed) of the print server 1000 also in the printer driver 102 that has been previously downloaded to the client computer 2000 by Point & Print.

Installation of the printer driver in the client computer 2000 utilizing the Point & Print function shown in FIG. 3A may be performed after the processing of the embodiment shown in FIGS. 5 and 6 is executed.

If the add-in installer has decided by an input from the user that the functionality of the printer driver 202 that has been installed in the client computer 2000 will not be expanded, then the key file 106 will not be registered in the driver configuration information 101 on the side of the print server 1000 by the processing of S612. Accordingly, the key file will not be registered in the configuration information 201 of the client computer 2000 even after installation utilizing the Point & Print function has been performed (S305).

Conversely, if the functionality of the printer driver 202 that has been installed in the client computer 2000 is expanded, then the key file will be registered in the driver configuration information 101 on the side of the print server 1000 by the processing of S602. Accordingly, in a case where installation utilizing the Point & Print function has been performed (S305), the key file is registered in the driver configuration information of the client computer 2000 and the add-in installer 104 is stored in the client computer 2000 as part of the installation set.

As described above, the print server 1000 transmits the installation set of the printer driver to the client computer 2000. The CPU within the print server 1000 runs the add-in installer 104. As a result, in accordance with an input from the user, the add-in installer 104 decides whether to transmit the installation set that activates the function expansion module at the time of Point & Print to the client computer 2000. If transmission of the installation set has been decided, then the add-in installer 104 writes the key data to the additional-program list. Next, if the add-in installer 104 decides that the installation set that activates the expansion module is to be transmitted and the key data or function expansion module has been written to the additional-program list, then the installation set that activates the function expansion module is transmitted to the client computer 2000. The installation set contains a program data group included in the additional-program list. Next, if the add-in installer 104 has decided that the installation set that activates the function expansion module is not to be transmitted to another information processing apparatus, then the add-in installer 104 deletes at least one of the key data and function expansion module from the additional-program list. Next, the print service module 100 transmits the program data that has been registered in the additional-program list to the client computer 2000 as an installation set in which the expansion module will not operate.

Figure 9:
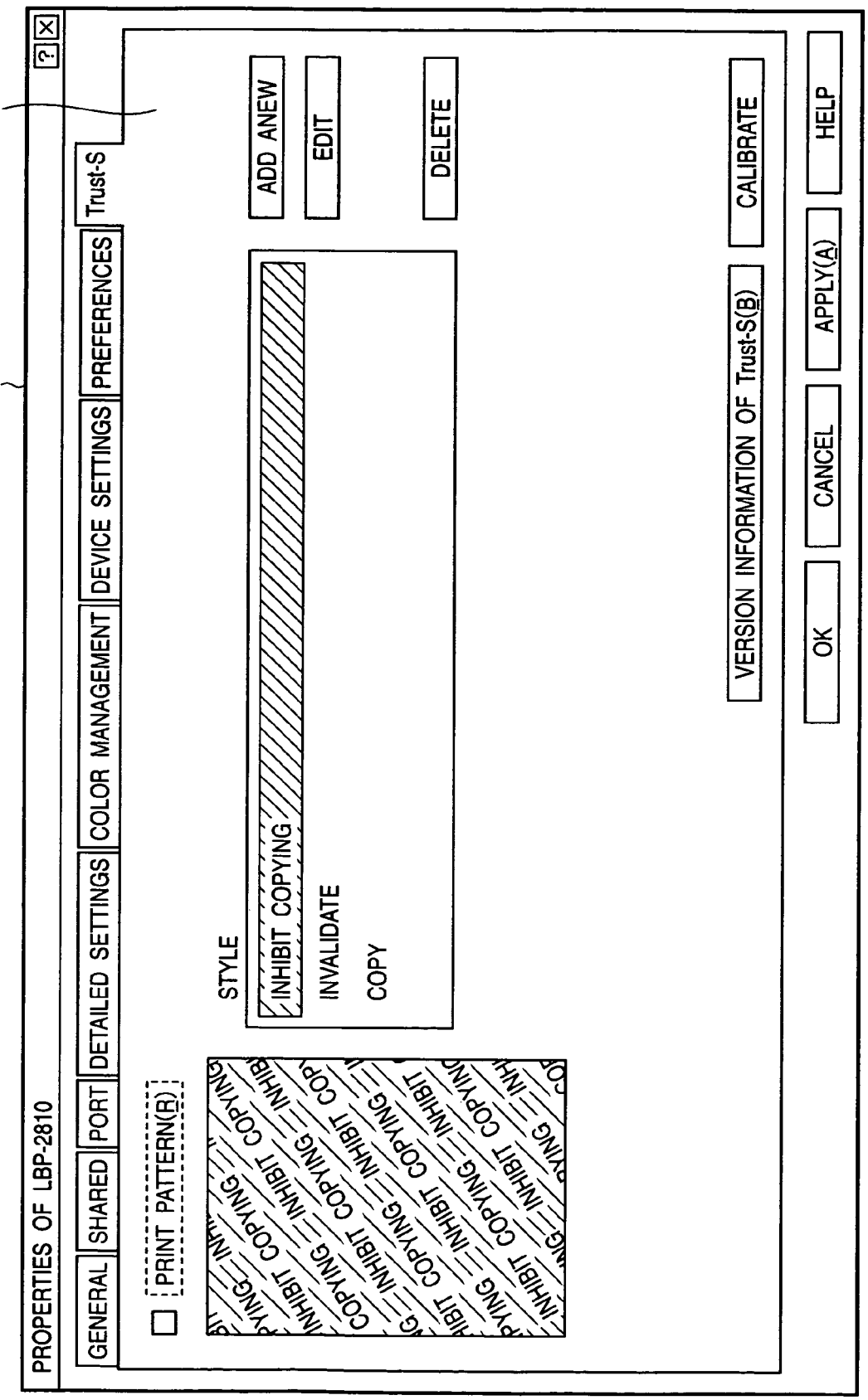
FIG. 9 is a diagram exemplifying the user interface of the printer driver after an additional file relating to the expansion function is installed by the add-in installer.

FIG. 8 is a diagram exemplifying the user interface of a printer driver before an additional file relating to an expansion function is installed by the add-in installer 104, and FIG. 9 is a diagram exemplifying the user interface of the printer driver after an additional file relating to the expansion function is installed by the add-in installer 104.

This example is such that when an additional file relating to expansion of a function is installed, a property sheet 901 is added to a dialog box 801 and settings (copy inhibit, invalidation, copy, etc.) that can be called from the property sheet 901 are provided as an expansion function. According to this embodiment, content that is settable from the property sheet 901 is such that copy inhibit has been selected as a setting that will not be changed from within an application 205, described later. However, depending upon the setting of the property sheet 901, it is also possible to make a change that makes copying possible from within the application 205.

Further, uninstall processing of an additional file, which processing is the reverse of the processing of this embodiment, can be implemented by replacing two processing steps in the embodiment described above.

Specifically, instead of executing step S603 (FIG. 6A) of copying the file of the additional-program list 107, the add-in installer 104 uses a deletion module, which is for deleting an additional file, to delete the key file 106 if the additional file and the key file 106 that have been stored in the operating system exist.

In addition, instead of executing step S604 of adding additional file information to the driver configuration information 101, the add-in installer 104 deletes information of an additional file from the driver configuration information 101 by a registration cancellation module that is for canceling registration of the information of the additional file.

By thus substituting these two steps into the processing of FIG. 6A, a file that has been additionally installed can be uninstalled from the server computer 1000.

Furthermore, by executing the processing of steps S606 to S611 in FIG. 6A and steps S651 to S653 in FIG. 6B, the additional file can be uninstalled even in the client computer 2000 connected via the network.

<Processing of Printer Driver>

Described next will be processing of a print control program (printer driver) for inhibiting operation of an additionally installed function expansion module depending upon whether the key file 106 exists or not.

Figure 10:
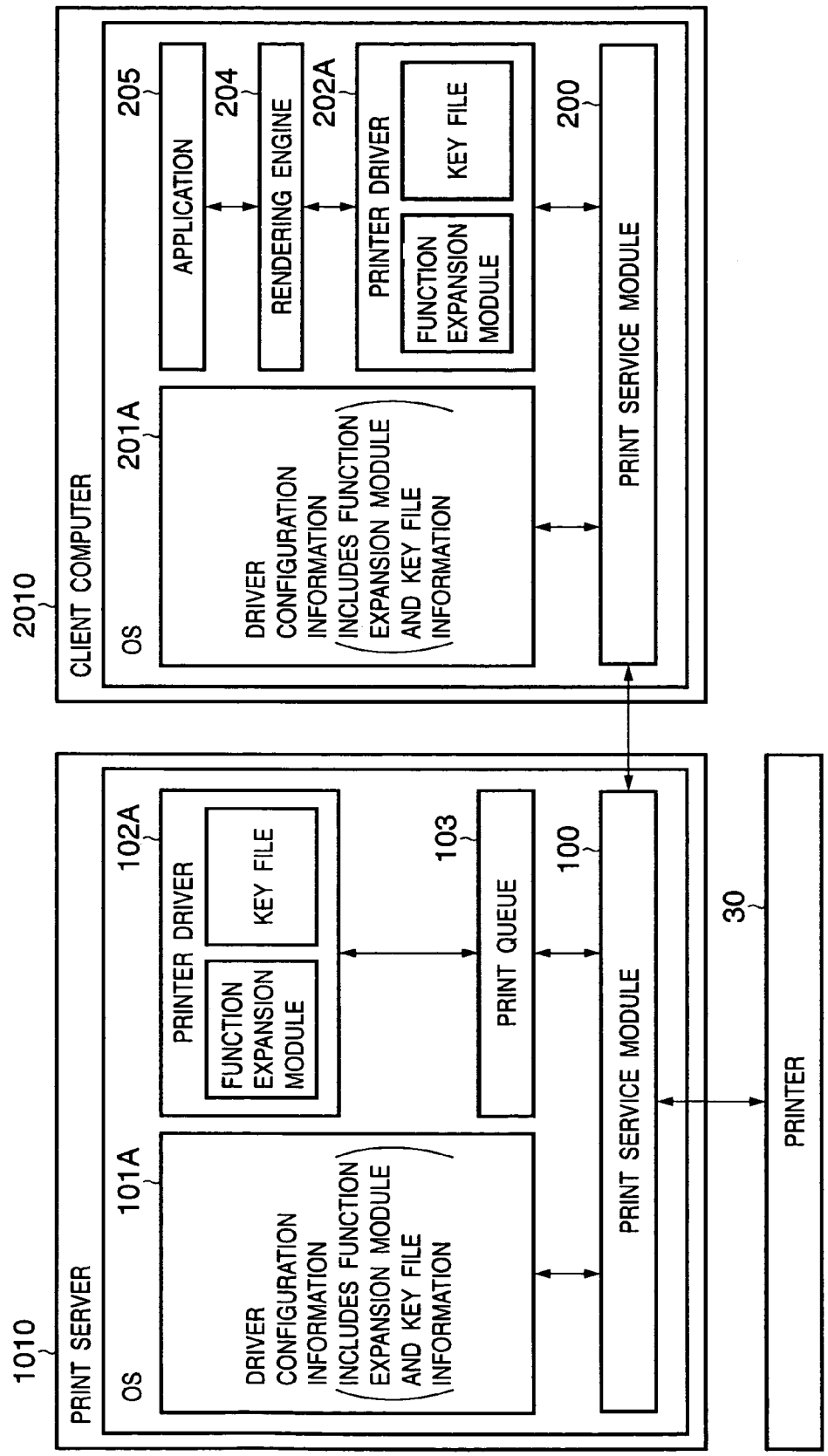
FIG. 10 is a block diagram illustrating the functional configuration of a print server system for describing the processing of a printer driver.

FIG. 10 is a block diagram illustrating the functional configuration of a print server system for describing the processing of a printer driver. Here blocks similar to those shown in FIG. 4B described above are designated by like reference characters. FIG. 10 represents a state in which additional-file installation processing described above with reference to FIGS. 4A, 4B and FIG. 9 has been executed.

Further, it is assumed that the printer 30 corresponding to printer drivers 102A and 202A in the printer server system has been connected via a network. Furthermore, a rendering engine 204 and an application 205 have been installed separately in a client computer 2010. The structure of the client computer 2010 differs from that of the client computer 2000 of FIG. 4B in these respects.

In Microsoft's Windows operating system, the rendering engine 204 accepts GDI (Graphic Device Interface) functions from the application 205 as graphic data, converts these functions to DDI (Device Driver Interface) functions and outputs the DDI functions to the printer driver 202A.

On the basis of the DDI functions accepted from the rendering engine 204, the printer driver 202A makes a conversion to a printer control command, such as PDL (Page Description Language), capable of being recognized by the printer. The printer control command obtained by the conversion is transferred to the print server 1000 of a print server 1010 as a print job via the print service module 200. The transferred print job is introduced into the print queue 103 that is applicable to the printer 30 and is output in sequence to the printer 30 as print data.

Figure 11:
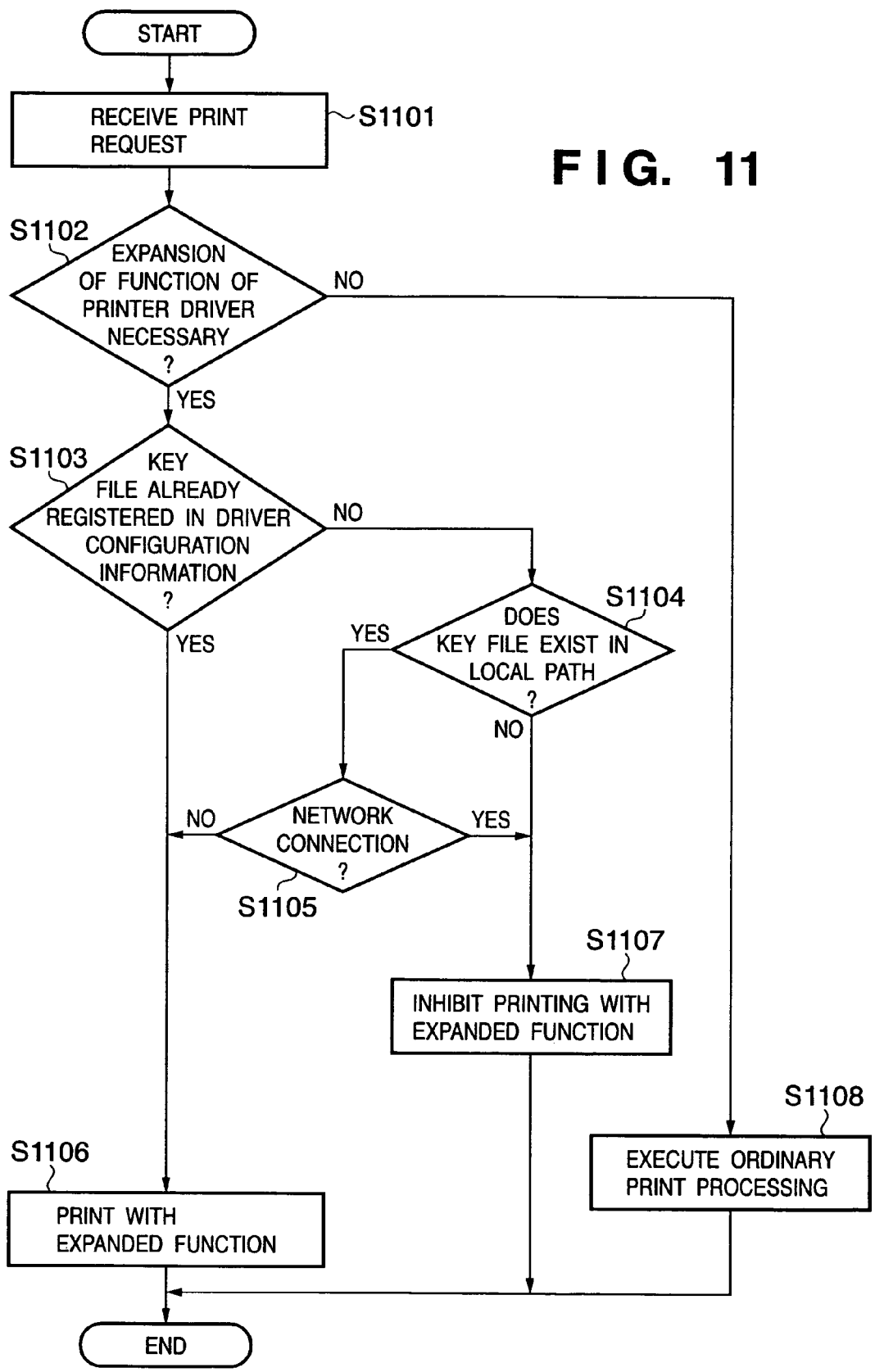
FIG. 11 is a flowchart for describing processing by a printer driver for inhibiting function expansion, which is based upon installation of an additional file, depending upon whether or not a key file exists.

FIG. 11 is a flowchart for describing processing by the printer driver 202A for inhibiting function expansion, depending upon whether or not a key file that is for activating the function expansion module exists, at the time of additional installation of an additional file.

First, at step S1101, the printer driver 202A receives a print request from the application 205 via the rendering engine 204. Next, in print processing in response to the request, the printer driver 202A determines at step S1102 whether printing in which the function of an already installed printer driver has been expanded is necessary or not.

If printing with expanded functionality is found to be unnecessary ("NO" at step S1102), then it is not necessary to inhibit print processing and therefore processing proceeds to step S1108, at which ordinary print processing is executed and processing is then exited.

On the other hand, in a case where the print request from the application 205 necessitates printing in which the function of the printer driver has been expanded ("YES" at step S1102), processing proceeds to step S1103.

At step S1103 it is determined within the printer driver 202A whether a key file for activating the program module (function expansion module) that expands the function of the printer driver exists in driver configuration information 201A.

If the key file exists ("YES" at step S1103), then the client computer 2010 is capable of activating the function expansion module for expanding the function of the already installed printer driver. Accordingly, processing proceeds to step S1106, where printing in which the function of the printer driver has been expanded (this is also referred to as "expanded-function printing") is performed and processing is exited.

On the other hand, if a key file does not exist in the driver configuration information 201A ("NO" at step S1103), then processing proceeds to step S1104, where the local area of the client computer 2010 is searched for the existence of the key file 106.

If the key file 106 does not exist in the local area of the client computer 2010 ("NO" at step S1104), then expanded-function printing cannot be executed. Processing therefore proceeds to step S1107, where expanded-function printing is inhibited.

Examples of operations for inhibiting expanded-function printing include an operation of aborting printing or foregoing printing with expanded functions and performing printing that reflects only the other ordinary functions capable of being executed without the existence of the key file, and an operation of implementing a received print request based upon the initial values (initial settings) of the printer driver without relying upon installation of an additional file. The details of these operations, however, are not described here.

On the other hand, if the key file 106 exists in the local area of the client computer 2010 ("YES" at step S1104), processing proceeds to step S1105.

At step S1105, the printer driver 202A determines whether another computer (a print server or client computer in the print server system) has been connected via the network. If another computer has been connected ("YES" at step S1105), then, even though the key file 106 exists, the printer driver 202A construes that the key file 106 has been placed in the local area of the client computer illegally, advances processing to step S1107 and inhibits expanded-function printing.

On the other hand, if another computer has not been connected to the network, i.e., if the print service module 200 is capable of communicating directly with the printer 30, then the additional installation with respect to the key file 106 has been performed correctly in the client computer 2010, processing proceeds to step S1106, expanded-function printing is executed and processing is exited.

The processing of steps S1104 and S1105 is processing for foregoing inhibition of printing with regard to a printer that has not been connected to the network, as at step S612 in FIG. 6A. By virtue of this processing, the target of print processing for inhibiting expanded-function printing is limited to a case where a printer driver has already been installed by Point & Print in a client computer that functions as another information processing apparatus.

In the case of, e.g., Microsoft's Windows (registered trademark), depending upon the version of the operating system, generation of a printer control command is executed using some modules of printer driver 102A of the print server 1000 even if the user performs print processing at the client computer 2000. In this case also the processing illustrated in FIG. 11 is executed by a printer driver that operates in an environment in which the application from which the user actually issues the print request is running, e.g., in the case of Microsoft's Windows (registered trademark), by a print-event handling unit of the UI module of printer driver 202A.

The print service module 200 of the client computer 2000 acquires the key data necessary to use the function expansion module. If the print service module 200 has not acquired the key data of the function expansion module, the function in which utilization of the functionality of the function expansion module is restricted, is realized by making a CPU execute the function of the printer driver 202.

Furthermore, the print service module 200 acquires the installation set that contains the key data and the function expansion module.

Further, if the key data has been acquired, the CPU of the client computer 2000 executes the function expansion module.

Thus, in accordance with the embodiment of the present invention, as described above, it is possible to prevent a program module that is for expanding the functions of a previously installed print control program from being additionally installed unconditionally.

Alternatively, in accordance with the embodiment of the present invention, it is possible to protect the commercial value of a program module for expanding the functions of a previously installed print control program.

Other Embodiments

As another embodiment, it is permissible to execute processing in which, before functionally expanded printing is performed at step 1106, an encryption key such as a character string or binary code held by the key file is checked, printing is executed if the encryption key is correct and is not executed if it is not correct. A key file containing this encryption key may be in a text format or may be an execution file that sends back an encryption key such as DLL.

The object of the invention is attained also by supplying a storage medium storing the program codes of the software for implementing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Examples of storage media that can be used for supplying the program code are a floppy disk, hard disk, optical disk, magneto-optical disk, CD-ROM, CD-R, magnetic tape, non-volatile type memory card or ROM, etc.

Further, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

Furthermore, the present invention also covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the embodiment of the present invention, as described above, it is possible to prevent a program module that is for expanding the functions of a previously installed print control program from being additionally installed unconditionally.

Alternatively, in accordance with the embodiment of the present invention, it is possible to protect the commercial value of a program module for expanding the functions of a previously installed print control program.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-250930 filed on Aug. 30, 2004 and Japanese Patent Application No. 2005-242064 filed on Aug. 24, 2005, which are hereby incorporated by reference herein.

What is claimed is:

1. An information processing apparatus for transmitting an installation set of a printer driver to another information processing apparatus based on an instruction of a Point and Print transmitted from the another information processing apparatus, comprising:
    a designation unit that designates, in a case where the instruction of the Point and Print is transmitted, whether or not to transmit an installation set that includes the printer driver and a function expansion module in order to expand a function of the printer driver and to be activated, to the another information processing apparatus by using an interface of the information processing apparatus;
    a decision unit that decides whether or not to transmit the installation set that includes the printer driver and the function expansion module to be activated to the another information processing apparatus based on a designation of said designation unit; and
    a transmitting unit that (i) transmits to the another information processing apparatus, in a case where a transmission of the installation set that includes the printer driver and the function expansion module to be activated is decided by said decision unit, the installation set that includes the printer driver and the function expansion module to be activated, based on the instruction of the Point and Print, and (ii) transmits to the another information processing apparatus, in a case where a transmission of the installation set that includes the printer driver and the function expansion module to be activated is not decided by said decision unit, an installation set that includes the printer driver and does not include the function expansion module to be activated, based on the instruction of the Point and Print.

2. The apparatus according to claim 1, wherein an installation set that activates the function expansion module is an installation set that includes the function expansion module and key data that activates the function expansion module, and
    wherein an installation set in which the function expansion module is not activated is an installation set that does not include at least one of the key data and function expansion module.

3. The apparatus according to claim 2, further comprising
    a file addition unit that copies the key data and the function expansion module, which have been registered in the installation set, to a storage area of an operating system;
    a file registration unit that additionally registers names of additional files of the key data and function expansion module, which have been copied to the storage area, in the configuration information of the printer driver; and
    a recognition unit that causes an installation control module of the operating system to recognize the fact that the configuration of the printer driver will be changed.

4. The apparatus according to claim 3, wherein said recognition unit causes content of the key data and function expansion module to be recognized by restarting the installation control module.

5. The apparatus according to claim 2, further comprising:
    a deletion unit that deletes the key data and function expansion module that have been additionally installed; and
    a registration cancellation unit that updates the configuration information of the printer driver in response to the deletion by said deletion unit.

6. The apparatus according to claim 5, wherein if the configuration information of the printer driver has been updated by said registration cancellation unit, said notification unit notifies the another information processing apparatus of the content of the updated configuration information of the printer driver.

7. The apparatus according to claim 1, further comprising a judging unit that judges whether the printer driver is being used for the purpose of controlling a printer shared with another information processing apparatus.

8. The apparatus according to claim 7, further comprising a notification unit that notifies the fact that the configuration of the printer driver will be changed to the another information processing apparatus connected to the shared printer, in a case where said judging unit judges that the printer driver is being used for the purpose of controlling the printer shared with the another information processing apparatus.

9. A method of controlling an information processing apparatus for transmitting an installation set of a printer driver to another information processing apparatus based on an instruction of a Point and Print transmitted from the another information processing apparatus, said method comprising:
    a designating step of designating, in a case where the instruction of the Point and Print is transmitted, whether or not to transmit an installation set that includes the printer driver and a function expansion module in order to expand a function of the printer driver and to be activated, to the another information processing apparatus by using an interface of the information processing apparatus;
    a decision step of deciding whether or not to transmit the installation set that includes the printer driver and the function expansion module to be activated to the another information processing apparatus based on a designation of said designating step; and
    a transmitting step of (i) transmitting to the another information processing apparatus, in a case where a transmission of the installation set that includes the printer driver and the function expansion module to be activated is decided by said decision step, the installation set that includes the printer driver and the function expansion module to be activated, based on the instruction of the Point and Print, and (ii) transmitting to the another information processing apparatus, in a case where a transmission of the installation set that includes the printer driver and the function expansion module to be activated is not decided by said decision step, an installation set that includes the printer driver and does not include the function expansion module to be activated, based on the instruction of the Point and Print.

10. The method according to claim 9, wherein an installation set that activates the function expansion module is an installation set that includes the function expansion module and key data that activates the function expansion module, and
    wherein an installation set in which the function expansion module is not activated is an installation set that does not include at least one of the key data and function expansion module.

11. The method according to claim 10, further comprising
    a file addition step of copying the key data and the function expansion module, which have been registered in the installation set, to a storage area of an operating system;

a file registration step of additionally registering names of additional files of the key data and function expansion module, which have been copied to the storage area, in the configuration information of the printer driver; and a recognition step of causing an installation control module of the operating system to recognize the fact that the configuration of the printer driver will be changed.

12. The method according to claim 11, wherein said recognition step causes content of the key data and function expansion module to be recognized by restarting the installation control module.

13. The method according to claim 10, further comprising:

a deletion step of deleting the key data and function expansion module that have been additionally installed; and a registration cancellation step of updating the configuration information of the printer driver in response to the deletion by said deletion step.

14. The method according to claim 13, wherein if the configuration information of the printer driver has been updated by said registration cancellation step, said notification step notifies the other information processing apparatus of the content of the updated configuration information of the printer driver.

15. The method according to claim 9, further comprising a judging step of judging whether the printer driver is being used for the purpose of controlling a printer shared with another information processing apparatus.

16. The method according to claim 15, further comprising a notification step of notifying the fact that the configuration of the printer driver will be changed to the another information processing apparatus connected to the shared printer, in a case where said judging step judges that the printer driver is being used for the purpose of controlling the printer shared with the another information processing apparatus.

17. A computer-readable storage medium storing a program for controlling an information processing apparatus for transmitting an installation set of a printer driver to another information processing apparatus based on an instruction of a Point and Print transmitted from the another information processing apparatus, said program comprising:

a designation module that designates whether to designate, in a case where the instruction of the Point and Print is transmitted, whether or not to transmit an installation set that includes the printer driver and a function expansion module in order to expand a function of the printer driver and to be activated, to the another information processing apparatus by using an interface of the information processing apparatus;

a decision module that decides whether or not to transmit the installation set that includes the printer driver and the function expansion module to be activated to the another information processing apparatus based on a designation of said designation module; and a transmitting module that (i) transmits to the another information processing apparatus, in a case where a transmission of the installation set that includes the printer driver and the function expansion module to be activated is decided by said decision module, the installation set that includes the printer driver and the function expansion module to be activated, based on the instruction of the Point and Print, and (ii) transmits to the another information processing apparatus, in a case where a transmission of the installation set that includes the printer driver and the function expansion module to be activated is not decided by said decision module, an installation set that includes the printer driver and does not include the function expansion module to be activated, based on the instruction of the Point and Print.

* * * * *